H. L. LAPHAM.
SEED TESTER.
APPLICATION FILED APR. 16, 1910.

979,175.                      Patented Dec. 20, 1910.

WITNESSES:

INVENTOR
Herbert L. Lapham
BY
ATTORNEYS

UNITED STATES PATENT OFFICE.

HERBERT LINCOLN LAPHAM, OF CALEDONIA, MINNESOTA.

SEED-TESTER.

979,175. Specification of Letters Patent. Patented Dec. 20, 1910.

Application filed April 16, 1910. Serial No. 555,955.

*To all whom it may concern:*

Be it known that I, HERBERT LINCOLN LAPHAM, a citizen of the United States, and a resident of Caledonia, in the county of Houston and State of Minnesota, have invented a new and Improved Seed-Tester, of which the following is a full, clear, and exact description.

This invention relates to seed testers, and has reference more particularly to a device of this kind, by means of which comparative germinating powers of different samples of seeds can be ascertained. The device comprises a tray, a layer of moisture-retaining material in the tray, and a cover upon the layer of material and having openings through it, each having a mark of identification associated therewith, the openings being adapted to receive seeds for germination.

The object of the invention is to provide a simple, inexpensive, and durable seed tester, by means of which a large number of seed samples can be tested at the same time, which provides means for properly identifying the various samples of seeds, in which the possibility of confusing the seeds is almost entirely eliminated, which permits the seeds to be easily inspected at all times, and which can be manipulated without difficulty, both in placing the seeds in the device, and in removing them for inspection.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1:
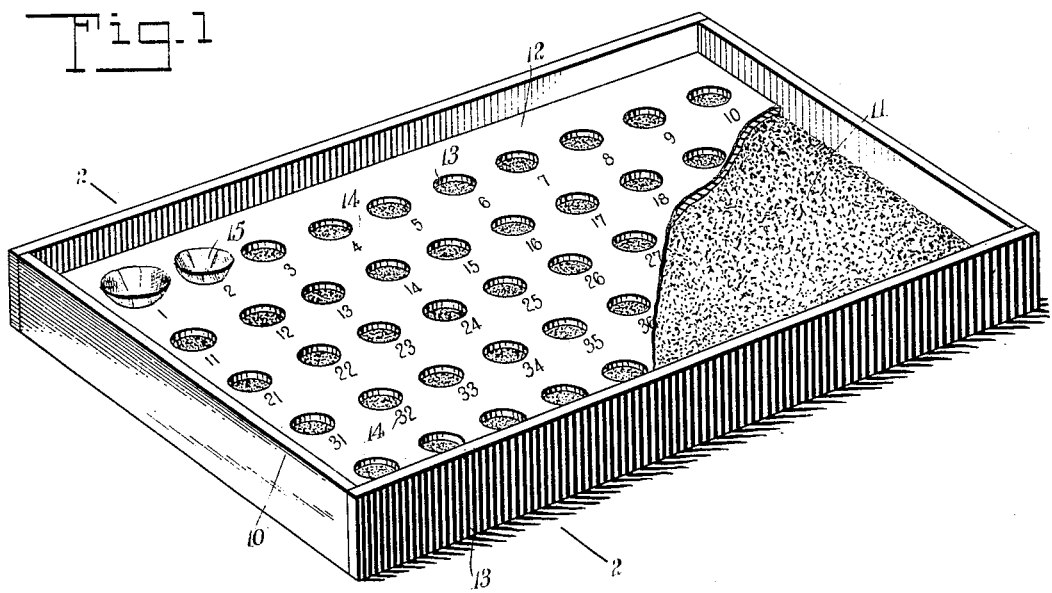
Figure 2:
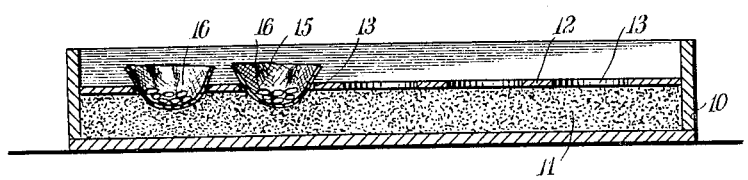
Figure 3:
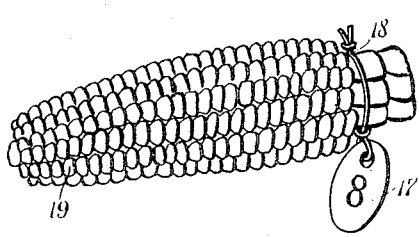

Figure 1 is a perspective view of an embodiment of my invention, showing a part of the cover broken away; Fig. 2 is a transverse section on the line 2—2 of Fig. 1; and Fig. 3 is a perspective view of an ear of seed corn having an identifying tag secured thereto.

Before proceeding to a more detailed explanation of my invention, it should be clearly understood that the tray, and the cover of the device can be fashioned from any suitable material, though I prefer to employ sheet metal or the like. The layer of material within the tray, which provides the moisture for causing the seeds to sprout while they are being tested, may consist of saw-dust, sand, earth, or any other material adapted for the purpose. I have shown for example, numbers for identifying the openings of the cover. Any other marks can of course be employed. I provide for each opening a tag, which is intended to be secured to the seed ear, or to the receptacle containing loose seeds, from which the sample is taken, which is placed in the correspondingly numbered perforation. Needless to say, these tags form no part of the invention, and may be of any suitable kind, and can be fastened to the ears by means of wires, or in any other manner adapted for the purpose. I prefer to employ pieces of fabric for holding the seeds placed in each opening of the cover. This fabric may consist of cheese cloth or any other material which will serve the purpose.

Referring more particularly to the drawings, I employ a receptacle 10, which consists preferably of a shallow tray, about four inches deep. This contains a uniform layer 11, of absorbent material, which is well moistened when the testing device is in use. Upon the layer 11 is located the removal cover or plate 12, which has suitable openings 13 therethrough. These are preferably round perforations, and each has adjacent to it, an identifying number, 14, painted or otherwise suitably inscribed on the cover.

A piece of fabric 15, of circular or other form is located in each opening, and is thrust partly through the cover, and into the material of the layer 11, forming a kind of cup 16, in which the seeds to be tested are located. The fabric serves to prevent the seeds from being scattered or lost in the material of the layer 11, and also permits them to be easily withdrawn for inspection, during the process of germination. I employ tags 17 having thereon identification numbers corresponding to the numbers of the openings 13, and provided with wires 18 for securing them to the seed ears 19, from which seeds are taken for testing. It will be understood that a few grains are taken from each seed ear to be tested, and are placed in one of the openings, upon the fabric, or are removed from the bag or other receptacle of seeds of one kind. The ear or bag is properly identified by means of the tag, so that the person conducting the test can always determine without difficulty, the source from which the sample seeds were taken. By providing a large number of openings 13, many different kinds of seeds can be tested at the same time. The device should be positioned in a light and warm place, to facilitate the sprouting of the seeds. It will be understood that sufficient moisture must be contained in the layer of material 11, to permit the seeds to germinate freely under favorable conditions. As all the test seeds receive the same amount of light, warmth and moisture, the comparative germinating powers thereof can be easily determined by inspection from time to time.

Having thus described my invention, I claim as new, and desire to secure by Letters Patent:

1. A seed tester, comprising a tray, a moisture retaining layer in said tray, a removable cover over said layer and having a plurality of openings through it, said cover having indicated thereon marks of identification for said openings, and separate pieces of permeable material each located in one of said openings, and extending through the same to said layer, said pieces being adapted to receive the seeds to be tested.

2. A seed tester, comprising a tray, a moisture retaining layer in said tray, a cover upon said tray and having openings through it, each having a mark of identification associated therewith, and fabric pieces located in said openings and forced partly through the same, to said layer, to form cup-like seed holders.

In testimony whereof I have signed my name to this specification in the presence of two subscribing witnesses.

HERBERT LINCOLN LAPHAM.

Witnesses:
  ROBERT BURNS,
  D. P. STEWART.